United States Patent
Niepoth et al.

(10) Patent No.: US 6,793,770 B1
(45) Date of Patent: Sep. 21, 2004

(54) EVAPORATOR

(75) Inventors: Klaus Niepoth, Rheinberg (DE); Boris Morgenroth, Wülfraht (DE)

(73) Assignee: Balcke-Durr Energietechnik GmbH (DE)

( * ) Notice: Subject to any disclaimer, the term of this patent is extended or adjusted under 35 U.S.C. 154(b) by 164 days.

(21) Appl. No.: 09/707,112

(22) Filed: Nov. 6, 2000

(30) Foreign Application Priority Data

Nov. 4, 1999 (EP) .................................... 99121832

(51) Int. Cl.⁷ .................... B01D 1/30; F28F 21/00
(52) U.S. Cl. .............. 159/43.1; 159/27.5; 159/37; 159/DIG. 15; 165/111; 165/DIG. 355; 165/60; 196/111; 202/251; 202/267.1
(58) Field of Search .................. 159/27.5, 17.3, 159/43.1, DIG. 15, 37, 45, 27.1; 203/86; 202/267.1, 158, 251; 165/111, 60, 913, DIG. 355, DIG. 362; 196/111; 127/16

(56) References Cited

U.S. PATENT DOCUMENTS

| | | | | |
|---|---|---|---|---|
| 3,622,387 A | * | 11/1971 | Grandadam | 127/16 |
| 3,627,582 A | * | 12/1971 | Dambrine et al. | 127/16 |
| 3,757,746 A | * | 9/1973 | Sharan | 122/250 R |
| 3,875,988 A | | 4/1975 | Machida et al. | |
| 3,879,215 A | * | 4/1975 | De Villiers et al. | 127/16 |
| 4,120,745 A | * | 10/1978 | Gotthard | 159/45 |
| 4,132,587 A | | 1/1979 | Lankenau et al. | |
| 4,217,176 A | | 8/1980 | Antony | |
| 4,636,283 A | * | 1/1987 | Nasser | 202/173 |
| 4,731,164 A | * | 3/1988 | Williamsom | 202/173 |
| 4,816,076 A | * | 3/1989 | Rein | 127/16 |
| 4,819,615 A | * | 4/1989 | Richardson et al. | 159/23 |
| 5,004,043 A | * | 4/1991 | Mucic et al. | 159/13.2 |
| 6,068,730 A | * | 5/2000 | Ramm-Schmidt et al. | 159/43.1 |
| 6,309,513 B1 | * | 10/2001 | Sephton | 202/155 |

FOREIGN PATENT DOCUMENTS

| | | |
|---|---|---|
| DE | 962 600 C | 4/1957 |
| DE | 197 29 710 A1 | 1/1998 |
| EP | 0 729 772 A2 | 9/1996 |
| EP | 0 853 224 A1 | 7/1998 |
| FR | 2 208 103 A | 6/1974 |

* cited by examiner

*Primary Examiner*—Virginia Manoharan
(74) *Attorney, Agent, or Firm*—Cantor Colburn LLP

(57) ABSTRACT

The invention concerns an evaporator, especially for the sugar industry, with at least two heat exchangers, into the top of which the medium to be concentrated is loaded and which are heated with steam with different compositions and/or different pressures in a cross stream, wherein the concentrated medium and the exhaust steam generated, after they come out of the heat exchanger, are carried off separately. To produce an evaporator that is simple and inexpensive in design, the invention proposes that the medium to be concentrated be loaded by a medium distribution common to all heat exchangers and the medium leaving the first heat exchanger go directly into the next heat exchanger. Only after the medium comes out of the second heat exchanger are the exhaust steam and the medium separated. The steam spaces in the heat exchanger separated from the exhaust steam space are separated from one another by a common dividing wall.

4 Claims, 1 Drawing Sheet

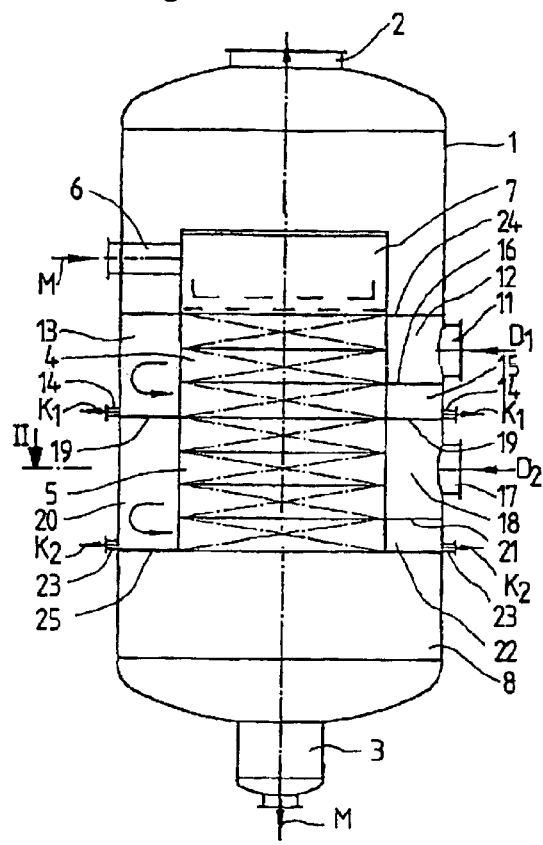
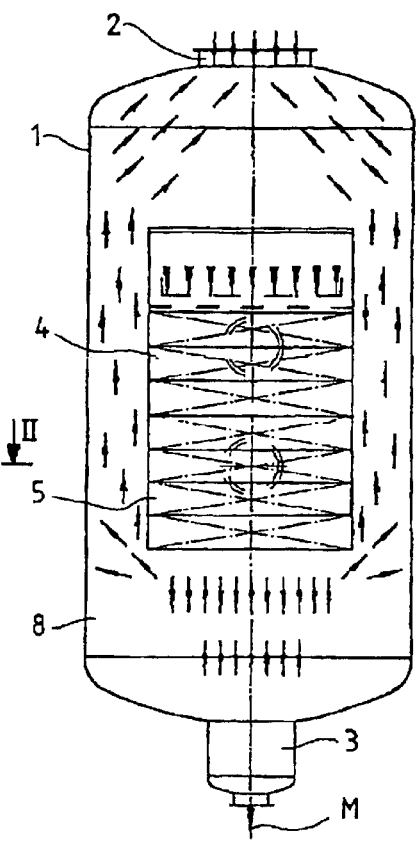
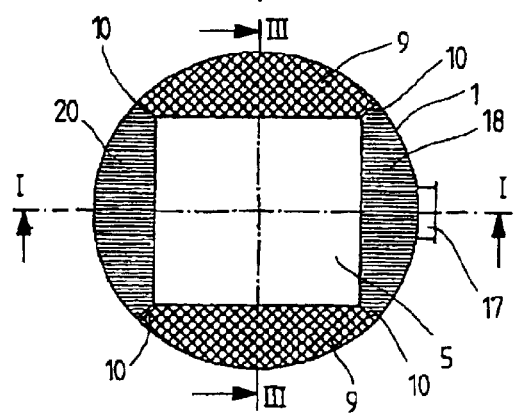

EVAPORATOR

TECHNICAL FIELD

The invention concerns an evaporator intended especially for the sugar industry, with at least two heat exchangers, into the top of which the medium being concentrated is loaded and which are heated with steam with different compositions and/or different pressures in a cross stream, wherein the concentrated medium and the exhaust steam generated is carried away from the heat exchanger separately after it comes out.

BACKGROUND OF THE INVENTION

These types of heat exchangers are known from EP 0 729 772 A2. Two heat exchangers are arranged one on top of the other in a common cylindrical housing, and they each have their own medium distribution and their own catch basin for the concentrated product. One heat exchanger is heated with hot steam, which comes from a steam turbine, as drawn off steam for example. The exhaust steam generated in the first heat exchanger are then used as a heating medium for the second heat exchanger. The product caught in the catch basin of the top heat exchanger is fed to the medium distributor of the next heat exchanger via a measurement and control device arranged laterally outside the housing.

The problem of the invention is to create an evaporator which is simpler and less expensive in design and with which the heat exchanger can be heated with different steam.

SUMMARY OF THE INVENTION

The invention's solution to this problem is characterized by the fact that the medium being concentrated is loaded by a media distribution common to all heat exchangers, and the medium that left the first heat exchanger goes directly into the next heat exchanger, by the fact that the exhaust steam and the medium are not separated until after the medium comes out of the second heat exchanger and by the fact that the steam spaces in the heat exchanger separated from the exhaust steam space are separated from one another by a common dividing wall.

With the evaporator design in the invention, despite the presence of at least two heat exchangers, only one medium distribution is needed. The medium being concentrated flows through the heat exchanger by gravity and is drawn off out of the bottom part of the evaporator. Each individual heat exchanger can be heated independently with steam despite the formation of one structural unit, so that steam with different compositions and/or different pressures can be used as a heating medium. In particular, it is possible to heat a heat exchanger with polluted or corrosive media, for example with steam that is polluted by corrosive substances in its contents, for example residues from the pulp dryer.

According to another feature of the invention, the condensates from the heat exchangers can be taken out of the heat exchangers through separate pipes, so that it is also possible to separate corrosive and non-corrosive media in this way. If the heat exchanger is heated with corrosive steam, it is possible to make the heat exchanger out of different materials. A heat exchanger heated with corrosive medium is then made of corrosive-resistant material.

One preferred form of embodiment of the invention proposes driving the first heat exchanger with exhaust steam from an evaporator for pulp and the second exchanger with turbine steam from a power plant, for example.

BRIEF DESCRIPTION OF THE DRAWINGS

The drawings show one example of embodiment of the evaporator in the invention schematically.

FIG. 1 shows a longitudinal section through the heat exchanger.

FIG. 2 shows a cross section along line II—II in FIG. 1, and

FIG. 3 shows another longitudinal section along line III—III in FIG. 1.

DETAILED DESCRIPTION OF THE PREFERRED EMBODIMENT

The evaporator is composed of a cylindrical housing 1, which has an outlet 2 for exhaust steam on the top and an outlet 3 for medium being concentrated on the bottom. Heat exchangers 4 and 5, which are made out of plate elements that have a cross stream flowing through them, are inside the housing 1, leaving a round space free on all sides.

The medium being concentrated goes through a side intake support 6 in a medium feed 7 arranged in the housing 1 that has suitable distribution sheets and makes sure that it is loaded evenly in the heat exchanger 4 under it. The medium being concentrated flows through the vertical channels of heat exchanger 4 and heat exchanger 5 and comes into an exhaust steam space 8 which takes up the whole cross section of the housing 1 under heat exchanger 5. In this exhaust steam space 8, the exhaust steam is separated from the medium being concentrated, which goes into outlet 3 by gravity, from which it is drawn off out of the housing 1. This is shown by arrow M at the intake support 6 and at the outlet 3.

The exhaust vapors rise up through two lateral steam channels 9 in the housing 1 and are drawn off through the exhaust steam outlet 2. The exhaust steam channels are formed by the space between the housing 1 and the heat exchangers 4 and 5, and are separated from the adjacent part of the inside of the housing by dividing sheet 10. Their position can be seen in particular in FIG. 2.

Due to a lateral steam support 11, for example, steam D coming from a pulp dryer is fed to a steam space 12, which is formed between the wall of the housing 1 and the horizontal intake channels of the heat exchanger 4 in FIG. 1. This steam D1 flows through roughly two thirds of the horizontal channels of heat exchanger 4 and goes into turning chamber 13, in which it circulates and enters the remaining horizontal channels of heat exchanger 4. The steam D1 is condensed in these remaining channels of heat exchanger 4. The condensate K1 is drawn off through the condensate support 14. There is a condensate space 15 under the steam space 12 that is separated from the steam space 12 by a dividing wall 16.

In the same way, heat exchanger 5 is heated with steam D2, which is turbine steam for example, by a lateral steam support 17. This steam D2 goes into a steam space 18, which like steam space 12, is formed by the outer wall of housing 1; the walls of heat exchanger 5 contain the horizontal channels and the dividing walls 10. Compared to steam space 12, steam space 18 is separated by a dividing wall 19 common to both steam spaces 12 and 18 that also separates the turning chamber 13 and a turning chamber 20 of heat exchanger 5 on the opposite side.

Steam D2 from the horizontal channels on top of heat exchanger 6 goes through this turning chamber 20 into the rest of the horizontal channels, in which the steam D2 condenses. The condensate K2 is drawn off out of the condensate space 22 formed under the steam space 18 by a dividing wall 21 by means of a condensate support 23. This type of condensate support 23 can also be arranged on the opposite side at the turning chamber 20.

Since the dividing wall 19 is also placed on top dividing walls 24 and bottom dividing walls 25 in the area of steam spaces 12 and 18 and turning chambers 13 and 20, there is complete separation between steam di and steam d2, so heat exchangers 4 and 5 can be heated independently of one another.

What is claimed is:

1. An evaporator comprising:
   at least a first heat exchanger and a second heat exchanger for top loading of a medium to be concentrated;
   means for heating each of said heat exchangers heat in cross stream by vapors having different compositions and different pressures;
   means for separately discharging said medium concentrated and exhaust vapors generated after escaping from said heat exchangers;
   a medium distributor common for all of said heat exchangers for feeding said medium to be concentrated;
   means for feeding the medium escaping from said first heat exchanger directly to the second heat exchanger;
   means for discharging the medium from the second heat exchanger thereby separating said medium from said exhaust vapors;
   a first common dividing wall for separating a space for said exhaust vapors from steam spaces of the heat exchangers; and
   a second dividing wall between said heat exchangers separating said steam spaces and/or turning chambers of the heat exchangers from each other.

2. The evaporator as set forth in claim 1 further comprising a separated conduit provided for each of said heat exchangers for separately discharging condensates of the heat exchangers that are received by condensing said vapors in said heat exchangers.

3. The evaporator as set forth in claim 1 wherein the heat exchangers are made of different materials.

4. The evaporator as set forth in claim 1 further comprising:
   means for heating said first heat exchangers by exhaust vapors; and
   means for heating said second heat exchanger by turbine steam.

* * * * *